United States Patent
Wada

(10) Patent No.: US 9,769,496 B2
(45) Date of Patent: Sep. 19, 2017

(54) METHOD, APPARATUS, AND PROGRAM FOR ENCODING IMAGE, METHOD, APPARATUS, AND PROGRAM FOR DECODING IMAGE, AND IMAGE PROCESSING SYSTEM

(71) Applicant: SAMSUNG ELECTRONICS CO., LTD., Suwon-si (KR)

(72) Inventor: Naofumi Wada, Yokohama (JP)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 159 days.

(21) Appl. No.: 14/584,716

(22) Filed: Dec. 29, 2014

(65) Prior Publication Data

US 2015/0189329 A1     Jul. 2, 2015

(30) Foreign Application Priority Data

Dec. 25, 2013   (JP) .................................. 2013-267440
Oct. 16, 2014   (JP) .................................. 2014-211917

(51) Int. Cl.
  *H04N 19/59*   (2014.01)
  *H04N 19/86*   (2014.01)
  *H04N 19/186*  (2014.01)

(52) U.S. Cl.
  CPC ............. *H04N 19/59* (2014.11); *H04N 19/86* (2014.11); *H04N 19/186* (2014.11)

(58) Field of Classification Search
  CPC ........... H04N 19/59; H04N 19/85; G06T 9/00
  See application file for complete search history.

(56) References Cited

U.S. PATENT DOCUMENTS

| 5,253,043 | A | * | 10/1993 | Gibson | .................... | H04N 9/64 348/708 |
|---|---|---|---|---|---|---|
| 8,094,711 | B2 | | 1/2012 | Tourapis et al. | | |
| 8,194,759 | B2 | | 6/2012 | Hagai et al. | | |
| 8,363,123 | B2 | | 1/2013 | Inaba et al. | | |

(Continued)

FOREIGN PATENT DOCUMENTS

| JP | 2003-179933 A | 6/2003 |
|---|---|---|
| JP | 2007-506361 A | 3/2007 |

(Continued)

OTHER PUBLICATIONS

Tomasi, C., et al., "Bilateral Filtering for Gray and Color Images", IEEE International Conference on Computer Vision, Jan. 1998, 8 pages total.

(Continued)

*Primary Examiner* — Stephen R Koziol
*Assistant Examiner* — Shaghayegh Azima
(74) *Attorney, Agent, or Firm* — Sughrue Mion, PLLC

(57) ABSTRACT

Provided is an image encoding device including an encoding unit that encodes a down-sampling image obtained by performing down-sampling of a color difference signal; a decoding unit that decodes the encoded encoding image; and a filter information generation unit that performs up-sampling of a color difference signal of the decoded decoding image, filters the color difference signal of the decoded image by using the up-sampled color difference signal of the decoded image and a luminance signal as reference signals, and acquires filter information related to the filtering.

18 Claims, 14 Drawing Sheets

(56) References Cited

U.S. PATENT DOCUMENTS

| | | | |
|---|---|---|---|
| 8,831,346 B2 | 9/2014 | Mitsunaga | |
| 2008/0247467 A1* | 10/2008 | Rusanovskyy | H04N 7/12 375/240.16 |
| 2010/0046612 A1* | 2/2010 | Sun | H04N 19/149 375/240.02 |
| 2010/0322303 A1 | 12/2010 | Wada et al. | |
| 2011/0243249 A1 | 10/2011 | Lee et al. | |
| 2012/0269458 A1* | 10/2012 | Graziosi | H04N 19/597 382/299 |
| 2013/0028538 A1* | 1/2013 | Simske | 382/300 |
| 2013/0039430 A1* | 2/2013 | Su | H04N 19/46 375/240.25 |
| 2013/0077884 A1* | 3/2013 | Ikai | G06T 9/00 382/233 |
| 2014/0085537 A1* | 3/2014 | Chujoh | H04N 9/646 348/453 |

FOREIGN PATENT DOCUMENTS

| | | |
|---|---|---|
| JP | 2009-153013 A | 7/2009 |
| JP | 2012-216888 A | 11/2012 |
| WO | 2009/110160 A1 | 9/2009 |

OTHER PUBLICATIONS

Wittmann, Steffen, et al., "Post-filter SEI message for 4:4:4 coding", Joint Video Team of ISO/IEC MPEG & ITU-T VCEG, JVT-5030, Apr. 2006, pp. 1-18.

Petschnigg, Georg et al., "Digital Photography with Flash and No-Flash Image Pairs", ACM Transactions on Graphics (SIGGRAPH2004), vol. 23, No. 3, pp. 664-672, Aug. 2004.

Zhang, Buyue et al., "Adaptive Bilateral Filter for Sharpness Enhancement and Noise Removal", IEEE Transactions on Image Processing, vol. 17, No. 5, May 2008, pp. 664-678.

* cited by examiner

FIG. 5

< FILTER PARAMETER >

| SORT | EXAMPLE |
|---|---|
| RADIUS OF FILTER KERNEL ( $r$ ) | 4 |
| DISTANCE STANDARD DEVIATION ( $s_D$ ) | 4 |
| LUMINANCE STANDARD DEVIATION ( $s_Y$ ) | 0.05 |
| FIRST COLOR DIFFERENCE STANDARD DEVIATION ( $s_{Cb}$ ) | 0.05 |
| SECOND COLOR DIFFERENCE STANDARD DEVIATION ( $s_{Cr}$ ) | 0.05 |
| HORIZONTAL SIZE OF BLOCK | 16 |
| VERTICAL SIZE OF BLOCK | 16 |

FIG. 6

< FILTER TYPE 1 >

| INDEX | FILTER |
|---|---|
| 0 | ABSENCE |
| 1 | PRESENCE |

FIG. 7

< FILTER TYPE 2 >

| INDEX | DISTANCE WEIGHT | LUMINANCE WEIGHT | FIRST COLOR (Cb) DIFFERENCE WEIGHT | SECOND COLOR (Cr) DIFFERENCE WEIGHT |
|---|---|---|---|---|
| 0 | ABSENCE | ABSENCE | ABSENCE | ABSENCE |
| 1 | ABSENCE | ABSENCE | ABSENCE | PRESENCE |
| 2 | ABSENCE | ABSENCE | PRESENCE | ABSENCE |
| 3 | ABSENCE | ABSENCE | PRESENCE | PRESENCE |
| 4 | ABSENCE | PRESENCE | ABSENCE | ABSENCE |
| 5 | ABSENCE | PRESENCE | ABSENCE | PRESENCE |
| 6 | ABSENCE | PRESENCE | PRESENCE | ABSENCE |
| 7 | ABSENCE | PRESENCE | PRESENCE | PRESENCE |
| 8 | PRESENCE | ABSENCE | ABSENCE | ABSENCE |
| 9 | PRESENCE | ABSENCE | ABSENCE | PRESENCE |
| 10 | PRESENCE | ABSENCE | PRESENCE | ABSENCE |
| 11 | PRESENCE | ABSENCE | PRESENCE | PRESENCE |
| 12 | PRESENCE | PRESENCE | ABSENCE | ABSENCE |
| 13 | PRESENCE | PRESENCE | ABSENCE | PRESENCE |
| 14 | PRESENCE | PRESENCE | PRESENCE | ABSENCE |
| 15 | PRESENCE | PRESENCE | PRESENCE | PRESENCE |

FIG. 9

< FILTER PARAMETER SYNTAX >

| filter_parameter( ) { |
|---|
| cb_kernel_size |
| cb_sigma_d |
| cb_sigma_y |
| cb_sigma_cb |
| cb_sigma_cr |
| cr_kernel_size |
| cr_sigma_d |
| cr_sigma_cb |
| cr_sigma_cr |
| blk_size_x |
| blk_size_y |
| } |

FIG. 10

< FILTER PARAMETER SYNTAX >

| filter_type( ) { |
|---|
| for( i=0; i<NumOfBlock; i++) { |
| cb_filter_type1_idx |
| if( cb_filter_type1_idx==1) { |
| cb_filter_type2_idx |
| } |
| cr_filter_type1_idx |
| if( cr_filter_type1_idx==1) { |
| cr_filter_type2_idx |
| } |
| } |
| } |

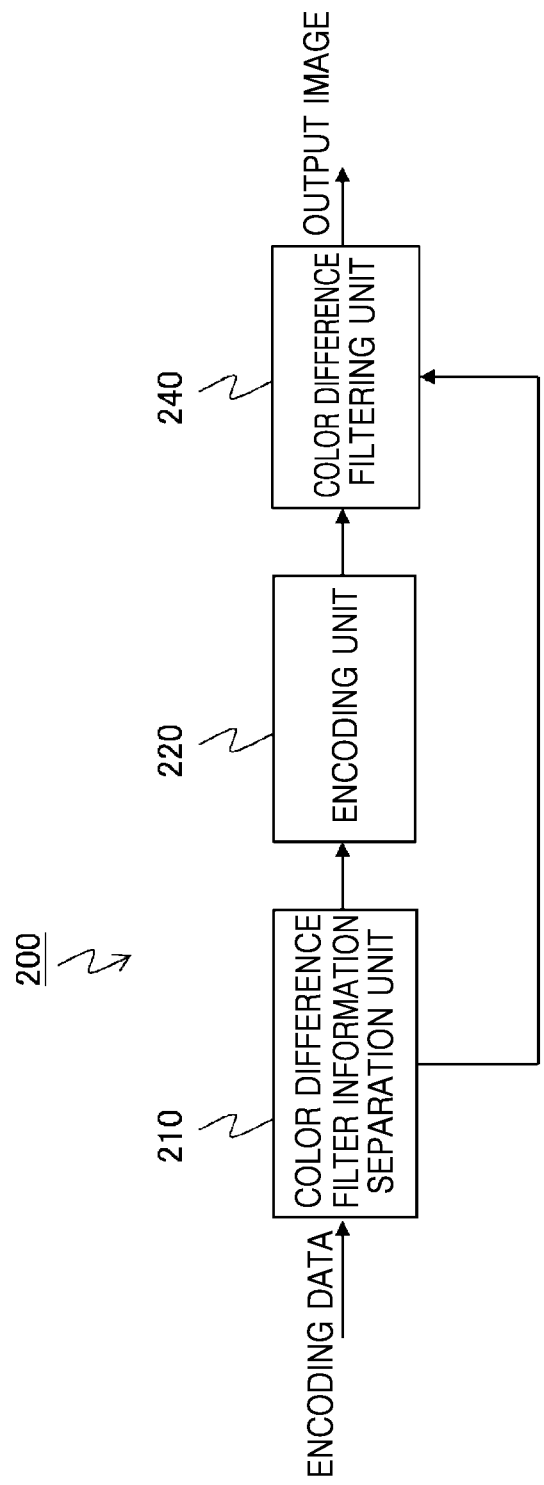

METHOD, APPARATUS, AND PROGRAM FOR ENCODING IMAGE, METHOD, APPARATUS, AND PROGRAM FOR DECODING IMAGE, AND IMAGE PROCESSING SYSTEM

RELATED APPLICATIONS

This application claims the benefit of Japanese Patent Application No. 2013-267440, filed on Dec. 25, 2013, in the Japanese Patent Office and Japanese Patent Application No. 2014-211917, filed on Oct. 16, 2014, in the Japanese Patent Office, the disclosures of which are incorporated herein in their entireties by reference.

BACKGROUND

1. Field

One or more exemplary embodiments relate to a method, apparatus, and program for encoding an image, a method, apparatus, and program for decoding an image, and an image processing system.

2. Description of the Related Art

Techniques capable of suppressing the deterioration of an image quality while increasing encoding efficiency in applying an image encoding technique such as JPEG, MPEG2, H. 264, or HEVC. For example, when an image deteriorated due to encoding is decoded, noise of the decoded image may be reduced by applying a post filter.

A bilateral filter disclosed in C. Tomasi and R. Manduchi, "Bilateral filtering for gray and color images", IEEE International Conference on Computer Vision (ICCV1998), pp. 839-846, January 1998 is one of nonlinear filters that are capable of reducing noise by smoothening an image while maintaining an edge. In addition, Japanese Laid-open Patent Publication No. 2009-153013 and Japanese Laid-open Patent Publication No. 2012-216888 disclose a bilateral filter.

In S. Wittmann and T. Wedi, "Post-filter SEI message for 4:4:4 coding", JVT (Joint Video Team) of ISO/IEC MPEG & ITU-T VCEG, JVT-5030, April, 2006, an encoding side designs and transmits a coefficient of a weiner filter so that a square error between a decoding image and a source image is minimized by using the encoding side having a source image (original image) before deterioration, and a decoding side performs post filtering.

In Pamphlet of International Publication No. 2009-110160, a coefficient of a weiner filter applied as a loop filter is designed in the same manner as in S. Wittmann and T. Wedi, "Post-filter SEI message for 4:4:4 coding", JVT (Joint Video Team) of ISO/IEC MPEG & ITU-T VCEG, JVT-5030, April, 2006, and information for adaptively switching between application and non-application of a filter is set and transmitted for each block so that a square error between a source image and a decoding image is minimized to thereby improve encoding efficiency. In PCT Japanese Translation Patent Publication No. 2007-506361, Japanese Laid-open Patent Publication No. 2003-179933, and US Patent Publication No. 2011/0243249, information generated on an encoding side is transmitted to control filtering on a decoding side, similar to Pamphlet of International Publication No. 2009-110160.

SUMMARY

In an encoding technique of the related art such as JPEG or MPEG, a YCbCr color system constituted by a luminance signal (Y) and color difference signals (Cb and Cr) is generally used. In addition, a 4:2:2 format or a 4:2:0 format in which Cb and Cr are sub-sampled is used, rather than a 4:4:4 format in which Y, Cb, and Cr have the same resolution. Compared with an original signal of the 4:4:4 format, not only encoding distortion but also image quality deterioration due to sub-sampling occurs in the color difference signal.

All of the above-mentioned techniques of the related art do not provide a color image quality improvement method for bringing a deteriorated color difference image having a 4:2:0 format after encoding close to a undeteriorated color difference image having a 4:4:4 format before encoding. For this reason, although the techniques may improve encoding efficiency, there is a problem in that the improvement in image quality is not sufficient.

Meanwhile, G. Petschnigg, M. Agrawala, H. Hoppe, R. Szeliski, M. Cohen and K. Toyama, "Digital photography with flash and no-flash image pairs", ACM Transactions on Graphics (SIGGRAPH2004), vol. 23, no. 3, pp. 664-672, August 2004 discloses an image quality improvement method using a reference type filter called a joint bilateral filter using two images having different characteristics. In G. Petschnigg, M. Agrawala, H. Hoppe, R. Szeliski, M. Cohen and K. Toyama, "Digital photography with flash and no-flash image pairs", ACM Transactions on Graphics (SIGGRAPH2004), vol. 23, no. 3, pp. 664-672, August 2004, noise is reduced without damaging naturalness of a non-flash image by applying a joint bilateral filter to the non-flash image while using two images having a high correlation between luminance values of a flash image and the non-flash image and using the flash image with little noise as a reference image.

However, in the joint bilateral filter of the related art, only a luminance signal is used as a reference signal and a target signal, and the improvement in a color difference signal is not considered, and thus there is a problem in that image quality is not sufficiently improved.

As described above, the related art has a problem that it is difficult to improve image quality and encoding efficiency.

According to one or more exemplary embodiments, an image encoding device includes an encoding unit that encodes a down-sampling image obtained by performing down-sampling of a color difference signal; a decoding unit that decodes the encoded encoding image; and a filter information generation unit that performs up-sampling of a color difference signal of the decoded decoding image, filters the color difference signal of the decoded image by using the up-sampled color difference signal of the decoded image and a luminance signal as reference signals, and acquires filter information related to the filtering.

The image encoding device may further include a multiplexing unit that multiplexes the acquired filter information and the encoding image to thereby generate encoding data.

The image encoding device may further include an up-sampling unit that performs up-sampling of the color difference signal of the decoded image, and a filtering unit that filters the up-sampled decoded image.

The filter information may include a filter parameter which is information for controlling a size or strength of a filter.

The filter information may include an adaptive parameter which is determined depending on characteristics of a frame on which the filtering is performed.

The filter information may include information on a filter type that includes a first index indicating whether or not the filtering is performed and a second index indicating whether or not at least one weight is applied to the filtering.

The second index may be set only when the filtering is performed.

The second index may indicate whether or not at least one weight of a distance weight, a luminance weight, a first color difference weight, and a second color difference weight is applied to the filtering.

The filter information generation unit may determine an optimal value of filter information so that an error between an image before performing down-sampling of the down-sampling image and the filtered decoded image is minimized.

According to one or more exemplary embodiments, an image decoding device includes a filter information separation unit that separates an encoding image and filter information from a reception unit that receives encoding data including the encoding image and the filter information, the encoding image being obtained by encoding a down-sampling image which is obtained by performing down-sampling of a color difference signal; a decoding unit that decodes the separated encoding image; and a filtering unit that performs up-sampling of the color difference signal of the decoded decoding image and filters the color difference signal of the decoded image in accordance with the filter information by using the up-sampled color difference signal of the decoding image and a luminance signal as reference signals.

The reception unit may include a filter information separation unit that separates the encoding image and the filter information from encoding data which is obtained by multiplexing the encoding image and the filter information.

The filter information may include a filter parameter which is information for controlling a size or strength of a filter.

The filter information may include an adaptive parameter which is determined depending on characteristics of a frame on which the filtering is performed.

The filter information may include information on a filter type that includes a first index indicating whether or not the filtering is performed and a second index indicating whether or not at least one weight is applied to the filtering.

The second index may be set only when the filtering is performed.

The second index may indicate whether or not at least one weight of a distance weight, a luminance weight, a first color difference weight, and a second color difference weight is applied to the filtering.

According to one or more exemplary embodiments, an image encoding method includes encoding a down-sampling image obtained by performing down-sampling of a color difference signal, decoding the encoded encoding image, performing up-sampling of a color difference signal of the decoded decoding image, filtering the color difference signal of the decoded image by using the up-sampled color difference signal of the decoded image and a luminance signal as reference signals, and acquiring filter information related to the filtering.

According to one or more exemplary embodiments, an image decoding method includes receiving encoding data including an encoding image obtained by encoding a down-sampling image and filter information, the down-sampling image being obtained by performing down-sampling of a color difference signal; decoding the encoding image separated from the encoding data; performing up-sampling of the color difference signal of the decoded decoding image; and filtering the color difference signal in accordance with the filter information by using the up-sampled color difference signal of the decoding image and a luminance signal as reference signals.

BRIEF DESCRIPTION OF THE DRAWINGS

These and/or other aspects will become apparent and more readily appreciated from the following description of the exemplary embodiments, taken in conjunction with the accompanying drawings in which:

FIG. 5 is a diagram illustrating an example of a filter parameter used in the encoding device according to the first embodiment;

FIG. 6 is a diagram illustrating an example of a filter type used in the encoding device according to the first embodiment;

FIG. 7 is a diagram illustrating another example of the filter type used in the encoding device according to the first embodiment;

FIG. 9 is a diagram illustrating an example of a filter parameter syntax used in the encoding device according to the first embodiment;

FIG. 10 is a diagram illustrating an example of a filter parameter syntax used in the encoding device according to the first embodiment;

FIG. 14 is a block diagram illustrating the configuration of the encoding device according to the second embodiment.

DETAILED DESCRIPTION

Figure 1:
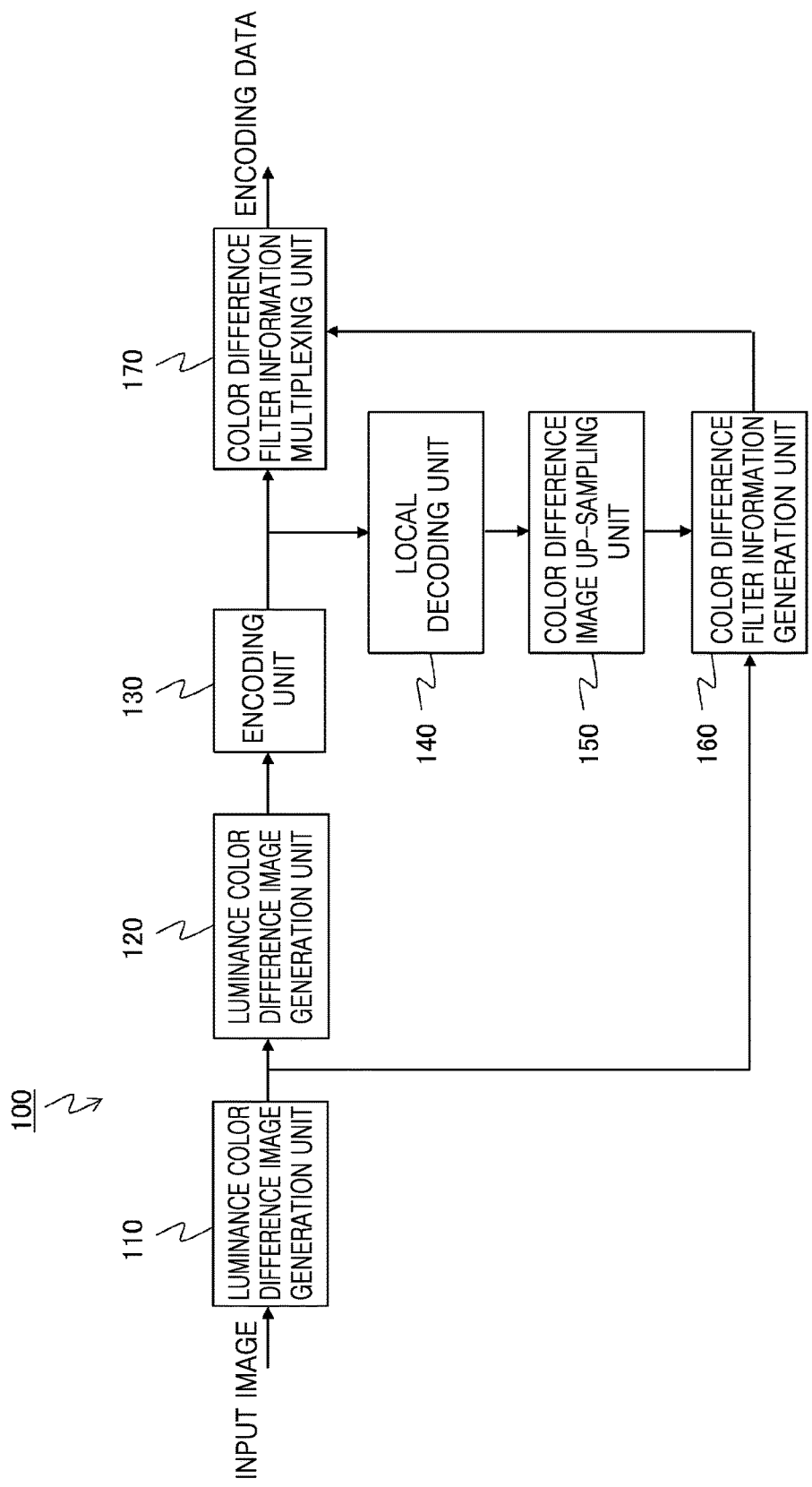
FIG. 1 is a block diagram illustrating the configuration of an encoding device according to a first embodiment.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects of the present description. Expressions such as "at least one of," when preceding a list of elements, modify the entire list of elements and do not modify the individual elements of the list.

First Embodiment

Hereinafter, a first embodiment will be described with reference to the accompanying drawings.

In the current embodiment, filtering is performed on a color difference image by using a joint bilateral filter which is a reference type filter and setting a luminance image and the color difference image as reference images to thereby reduce noise of the color difference image and to improve the sharpness of the color difference image. In the current embodiment, an encoding side may design a filter parameter indicating the size and strength of a filter. In the current embodiment, the encoding side may design a filter type so as to change a reference image for each block. A decoding side performs filtering by using the designed filter parameter and filter type, and thus it is possible to improve image quality of the color difference image and to improve encoding efficiency.

FIG. 1 is a block diagram illustrating the configuration of an encoding device 100 according to the current embodiment. The encoding device 100, which is a device that transmits encoding data obtained by encoding an input image, constitutes an image processing system together with a decoding device to be described later. For example, the decoding device may be connected to the encoding device 100 in a communicable manner through any communication line and may receive encoding data through the communication line.

Referring to FIG. 1, the encoding device 100 according to the current embodiment may include a luminance color difference image generation unit 110, a color difference image down-sampling unit 120, an encoding unit 130, a local decoding unit 140, a color difference image up-sampling unit 150, a color difference filter information generation unit 160, and a color difference filter information multiplexing unit 170.

In addition, functions of the encoding device 100 shown in FIG. 1 may be performed by at least one of hardware and software. For example, the functions of the encoding device 100 may be performed using one hardware or software or may be performed using a plurality of pieces of hardware or software. The functions of the encoding device 100 may also be realized by a computer including a central processing unit (CPU), a memory, and the like. For example, an encoding program for performing an encoding method, to be described later, according to the current embodiment is recorded in a storage device so that the encoding program recorded in the storage device is executed by the CPU, thereby allowing the functions of the encoding device to be realized. This is true of a decoding device to be described later.

The luminance color difference image generation unit 110 converts an input image which is input to thereby generate a luminance color difference image serving as a source image. Here, the input image may be an RGB image having a 4:4:4 format. The luminance color difference image generation unit 110 converts the RGB image having a 4:4:4 format into a YCbCr image (luminance color difference image) having a 4:4:4 format and determines the converted image to be a source image. Meanwhile, the input image is not limited to the RGB image and may be an HSV image, and the luminance color difference image is not limited to the YCbCr image and may be a YUV image.

The color difference image down-sampling unit 120 may perform down-sampling of color difference signals (Cb and Cr) of the YCbCr image (source image) having a 4:4:4 format which is generated by the luminance color difference image generation unit 110.

Figure 2:
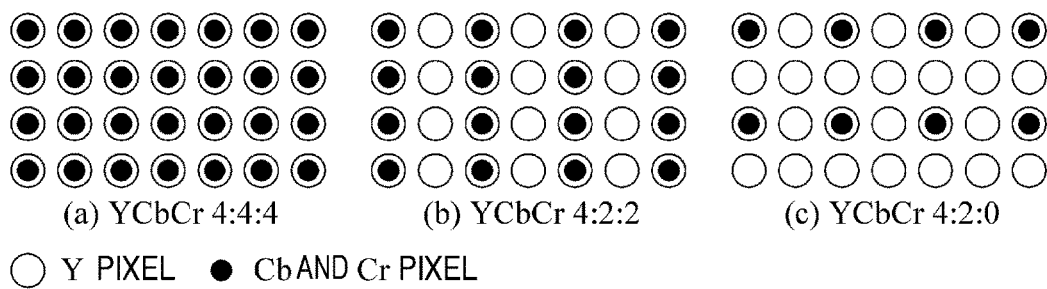
FIG. 2 is a conceptual diagram illustrating formats of images used in the encoding device according to the first embodiment.

FIG. 2 is a conceptual diagram illustrating color difference sub-sampling of an image having a 4:4:4 format, an image having a 4:2:2 format, and an image having a 4:2:0 format, respectively.

The image having a 4:4:4 format which is shown in FIG. 2 is an image in which a luminance signal (Y) and color difference signals (Cb and Cr) have the same sampling frequency. In the image having a 4:4:4 format, a luminance signal (Y) and color difference signals (Cb and Cr) have the same amount of information (resolution).

The image having a 4:2:2 format which is shown in FIG. 2, color difference signals (Cb and Cr) have a sampling frequency which is half of that of a luminance signal (Y). In the image having a 4:2:2 format, the amounts of information (resolution) of the respective color difference signals (Cb and Cr) are half of the amount of information (resolution) of the luminance signal (Y) in a horizontal direction.

In the image having a 4:2:0 format which is shown in FIG. 2, sampling frequencies of color difference signals (Cb and Cr) are half of that of a luminance signal (Y). In the image having a 4:2:0 format, the color difference signals (Cb and Cr) are sampled every other scanning line in a horizontal direction. In the image having a 4:2:0 format, the amounts of information (resolution) of the respective color difference signals (Cb and Cr) are half of the amount of information of a luminance signal (Y) in a vertical direction and a horizontal direction, respectively.

The degree of importance of a color difference signal is lower than that of a luminance signal according to human visual characteristics. For this reason, in a 4:2:2 format or a 4:2:0 format, encoding efficiency is increased by reducing the resolution of the color difference signal. However, in the 4:2:2 format or the 4:2:0 format, since the resolution of the color difference signal is low, color blurring occurs due to fading of an edge such as a character or a telop, and thus there is a problem in that image quality is deteriorated.

In the current embodiment, the color difference image down-sampling unit 120 performs sub-sampling of color difference signals (Cb and Cr) of a YCbCr image having a 4:4:4 format as shown in FIG. 2 in horizontal and vertical directions to thereby generate a YCbCr image (down-sampling image) having a 4:2:0 format as shown in FIG. 2, and thus it is possible to improve the image quality of an image.

The encoding unit 130 may encode the YCbCr image (down-sampling image) having a 4:2:0 format which is generated by the color difference image down-sampling unit 120 to thereby generate image information (encoding image). In the current embodiment, an encoding method of a still image is described as an example, but the embodiment of the present invention may be applied to any encoding method. For example, the encoding unit 130 may encode a moving image according to an H. 264 or high efficiency video coding (HEVC) technique.

The local decoding unit (first decoding unit) 140 may decode encoding image (image information) which is encoded by the encoding unit 130 to thereby generate a local decoding image. The local decoding image is a YCbCr image having a 4:2:0 format. When the encoded image is a moving image, the local decoding unit 140 may perform decoding in units of frames.

The color difference image up-sampling unit (first up-sampling unit) 150 may perform up-sampling of color difference signals (Cb and Cr) of the local decoding image having a 4:2:0 format which is generated by the local decoding unit 140 to thereby generate a local decoding image having a 4:4:4 format. The up-sampling may be performed using an interpolation filter of the related art such as a bilinear or bi-cubic filter.

The color difference filter information generation unit 160 may generate a color difference filter information so that a square error between the local decoding image generated by the color difference image up-sampling unit 150 through up-sampling and a source image having a 4:4:4 format which is generated by the luminance color difference image generation unit 110 is minimized. The color difference filter information may be transmitted to the decoding device. The color difference filter information is control information for controlling filtering in the decoding device. The processing of the color difference filter information will be described later.

The color difference filter information multiplexing unit 170 may multiplex the image information (encoding image) generated by the encoding unit 130 and the color difference filter information generated by the color difference filter information generation unit 160 to thereby generate encoding data. The color difference filter information multiplexing unit 170 may transmit the generated encoding data to the decoding device. Here, any multiplexing method may be used as a method of multiplexing the image information generated by the encoding unit 130 and the color difference filter information.

Figure 3:
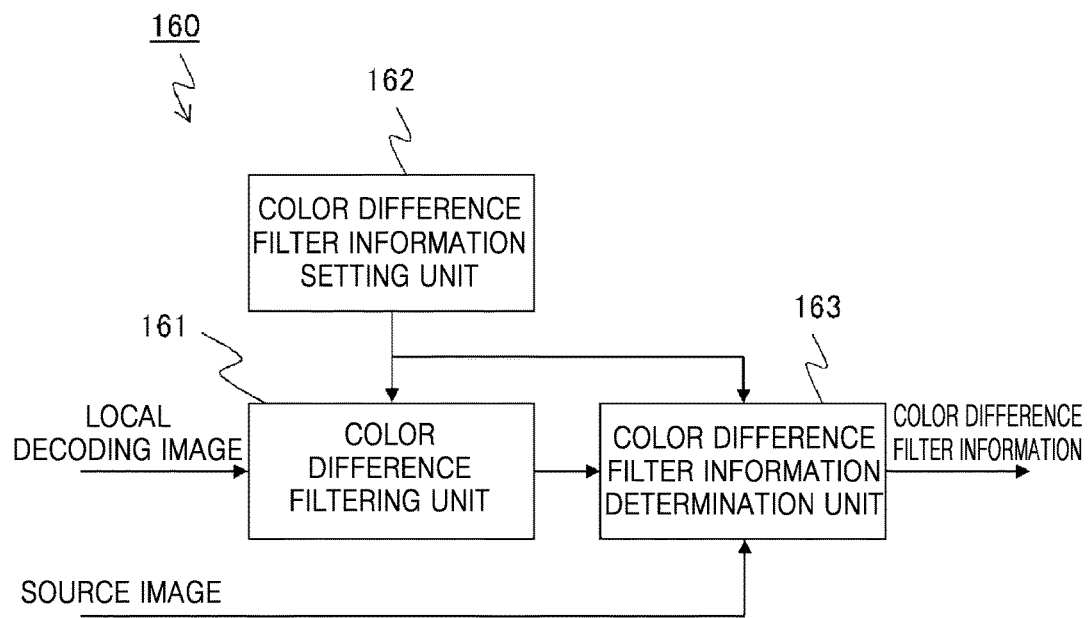
FIG. 3 is a block diagram illustrating the configuration of a color difference filter information generation unit according to the first embodiment.

The color difference filter information generation unit 160 described above with reference to FIG. 1 will be described in detail with reference to FIG. 3. FIG. 3 is a block diagram illustrating the configuration of the color difference filter information generation unit 160 according to the current embodiment. As shown in FIG. 3, the color difference filter information generation unit 160 according to the current embodiment includes a color difference filtering unit 161, a color difference filter information setting unit 162, and a color difference filter information determination unit 163.

The color difference filtering unit (first filtering unit) 161 may acquire an up-sampled local decoding image from the color difference image up-sampling unit 150 to thereby perform reference type filtering on the local decoding image in accordance with color difference filter information which is set by the color difference filter information setting unit 162.

The color difference filtering unit 161 may remove noise of color difference signals (Cr and Cb) and may improve resolution by setting a luminance signal (Y) as a reference signal and using a reference type filter.

In the current embodiment, a joint bilateral filter may be used as an example of the reference type filter. In the current embodiment, not only the luminance signal (Y) but also the color difference signals (Cb and Cr) are used as reference signals, and thus weight terms corresponding to the color difference signals (Cr and Cb) may be added to a weight term of a filter. In the current embodiment, weight terms corresponding to the color difference signals (Cr and Cb) may be added to a weight term of a filter, and thus it is possible to solve a problem that color blurring occurs in a region having no difference in pixel value between pixels of a luminance image and having a difference in pixel value between pixels of a color difference image (for example, a color edge region where a red background includes a blue line).

Figure 4:
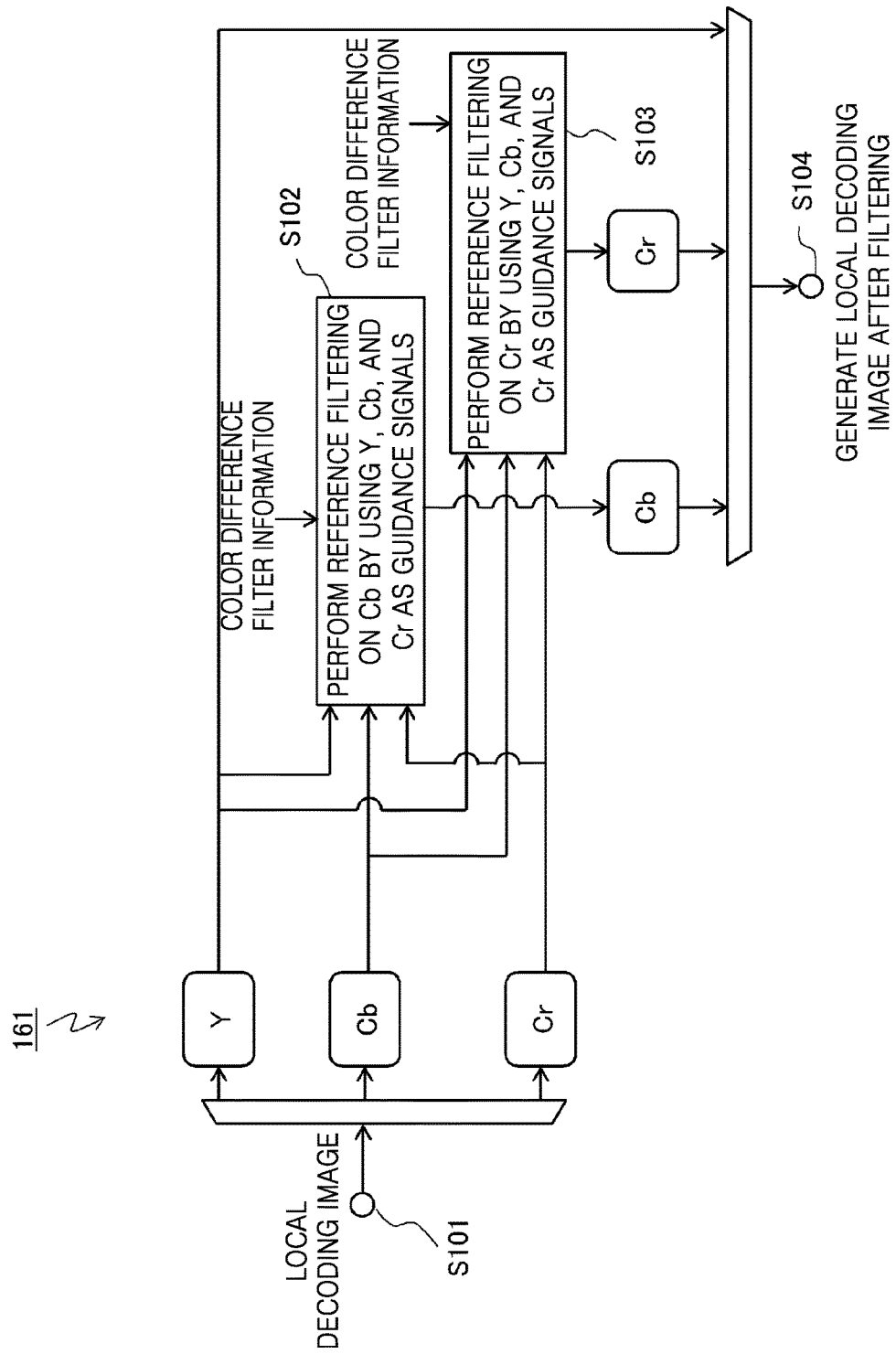
FIG. 4 is a diagram illustrating a color difference filtering unit according to the first embodiment.

FIG. 4 shows an example of filtering performed by the color difference filtering unit 161 using a reference type filter. Referring to FIG. 4, in operation S101, the color difference filtering unit 161 may separate a luminance signal (Y) and color difference signals (Cb and Cr) which are included in a local decoding image. According to another example, the color difference filtering unit 161 may input the luminance signal (Y) and the color difference signals (Cb and Cr) which are separated from each other to thereby perform filtering.

In operation S102, the color difference filtering unit 161 may filter the color difference signal (Cb) which is a target signal on the basis of color difference filter information by using the luminance signal (Y) and the color difference signals (Cb and Cr), which are separated from each other in operation S101, as reference signals (operation S102). The color difference filtering unit 161 may perform filtering on the color difference signal (Cb) by setting the luminance signal (Y) and the color difference signals (Cb and Cr) as reference signals and using a joint bilateral filter which is a reference type filter. The color difference filtering unit 161 may improve detailed resolution of the color difference signal (Cb) and remove noise by using detailed information of the luminance image and the color difference image.

In operation S103, the color difference filtering unit 161 may perform filtering on the color difference signal (Cr) which is a target signal on the basis of color difference filter information by using the luminance signal (Y) and the color difference signals (Cb and Cr), which are separated from each other in operation S101, as reference signals (operation S103). The color difference filtering unit 161 may perform filtering on the color difference signal (Cr) by setting the luminance signal (Y) and the color difference signals (Cb and Cr) as reference signals and using a joint bilateral filter which is a reference type filter. The color difference filtering unit 161 may improve detailed resolution of the color difference signal (Cr) and may remove noise by using detailed information of the luminance image and the color difference image.

In operation S104, the color difference filtering unit 161 may synthesize the luminance signal (Y) separated in operation S101, the color difference signal (Cb) filtered in operation S102, and the color difference signal (Cr) filtered in operation S103 to thereby generate a local decoding image. The color difference filtering unit 161 may output the generated local decoding image.

In operations S102 and S103, the reference type filter used by the color difference filtering unit 161 may be expressed by the following Expression 1.

$$F[C]_p = \frac{1}{W_p} \sum_{q \in \Omega} G_{\sigma_s}(\|p-q\|) \cdot G_{\sigma_{r0}}(|Y_p - Y_q|) \cdot \qquad (1)$$

$$G_{\sigma_{r1}}(|Cb_p - Cb_q|) \cdot G_{\sigma_{r2}}(|Cr_p - Cr_q|) \cdot C_q.$$

Here, a color difference image which is a filtering target is set to C (for example, Cb or Cr), and an image obtained by performing filtering on the color difference image C is set to F[C]. In addition, P denotes a position of a pixel to be filtered, q denotes a position of a pixel close to a pixel to be filtered, and Y, Cb, and Cr denote pixel values of a luminance image, a first color difference image (Cb), and a second color difference image (Cr), respectively. In addition, G(x) denotes a two-dimensional Gaussian Kernel and may be expressed by the following Expression 2.

$$G_\sigma(x) = \frac{1}{2\pi\sigma^2} \exp\left(-\frac{x^2}{2\sigma^2}\right) \qquad (2)$$

In addition, σs, σr0, σr1, and σr2 in Expression 1 denote standard deviations of Gaussian distribution of weights regarding a distance, a luminance, a first color difference (Cb), and a second color difference (Cr), respectively. Here, Wp denotes a normalization coefficient and is expressed by the following Expression 3 so that the sum of weights is set to 1.

$$W_p = \sum_{q \in \Omega} G_{\sigma_s}(\|p-q\|) \cdot G_{\sigma_{r0}}(|Y_p - Y_q|) \cdot \qquad (3)$$

$$G_{\sigma_{r1}}(|Cb_p - Cb_q|) \cdot G_{\sigma_{r2}}(|Cr_p - Cr_q|).$$

In Expression 3, Gσs, Gσr0, Gσr1, and Gσr2 are weight coefficients of a filter which indicate a distance weight, a luminance weight, a first color difference weight, and a second color difference weight.

In the current embodiment, pieces of information of a radius r of a filter kernel for determining Ω in Expression 1, and the above-mentioned σs, σr0, σr1, and σr2 will be referred to as filter parameters. The filter parameter is filter basic information for controlling the size and strength of a filter as basic parameters of filtering. In the current embodiment, information on whether or not a filter is applied and information on whether or not the distance weight, the luminance weight, the first color difference weight, and the second color difference weight are used will be referred to as filter types. The filter type is filter detailed information for controlling filtering performed using filter parameters in more detail. The filter parameter and the filter type will be collectively referred to as color difference filter information.

In the current embodiment, a frame is divided into blocks having a predetermined size, and a filter type may be controlled in units of blocks. Here, a value for determining the size of the block may be included in the filter parameter.

FIG. 5 shows an example of filter parameters according to the current embodiment. Referring to FIG. 5, the filter parameters include information on a radius of a kernel of the above-mentioned reference type filter, a distance standard deviation, a luminance standard deviation, a first color difference standard deviation, a second color difference standard deviation, and the size of a block.

FIGS. 6 and 7 show an example of a filter type which is defined in order to control an image in units of blocks. Here, the filter type includes a filter type 1 and a filter type 2. Hereinafter, it is assumed that the filter type 1 is a first index and that the filter type 2 is a second index. Referring to FIG. 6, the first index is information indicating whether or not filtering is performed and may be indicated by a value of 0 or 1. Referring to FIG. 7, the second index is information indicating whether or not a distance weight, a luminance weight, a first color difference weight, and a second color difference weight are applied and may be indicated by any one value of 0 to 15.

The color difference filter information setting unit 162 of FIG. 3 may set a filter parameter and a filter type as color difference filter information for each color of difference signals (Cb and Cr). The color difference filtering unit 161 may perform filtering according to the set color difference filter information. The color difference filter information setting unit 162 generates a plurality of pieces of color difference filter information including information of the filter parameter of FIG. 5 which is set in units of frames and information of the filter type of FIGS. 6 and 7 which is set in units of blocks. The color difference filter information setting unit 162 applies the generated pieces of color difference filter information to the color difference filtering unit 161. In addition, the color difference filter information determination unit applies the generated pieces of color difference filter information to the color difference filtering unit 161 and transmits the color difference filter information to the color difference filter information determination unit 163.

Figure 8:
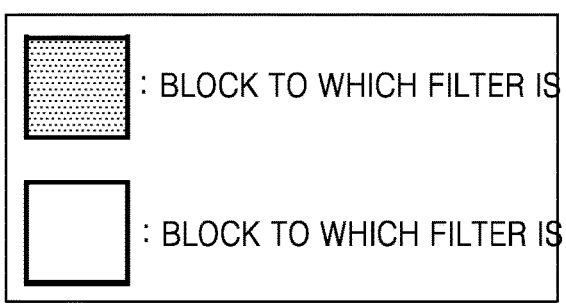
FIG. 8 is a diagram illustrating a method of applying a filter for each block in the encoding device according to the first embodiment.

FIG. 8 is a conceptual diagram illustrating a method of changing a filter type in units of blocks. Referring to FIG. 8, the color difference filter information setting unit 162 selects a filter parameter in units of frames and selects a filter type in units of blocks which are generated by dividing a frame. In the current embodiment, the filter type is determined in units of blocks, and thus the filter type is locally changed, thereby improving encoding efficiency.

Figure 12:
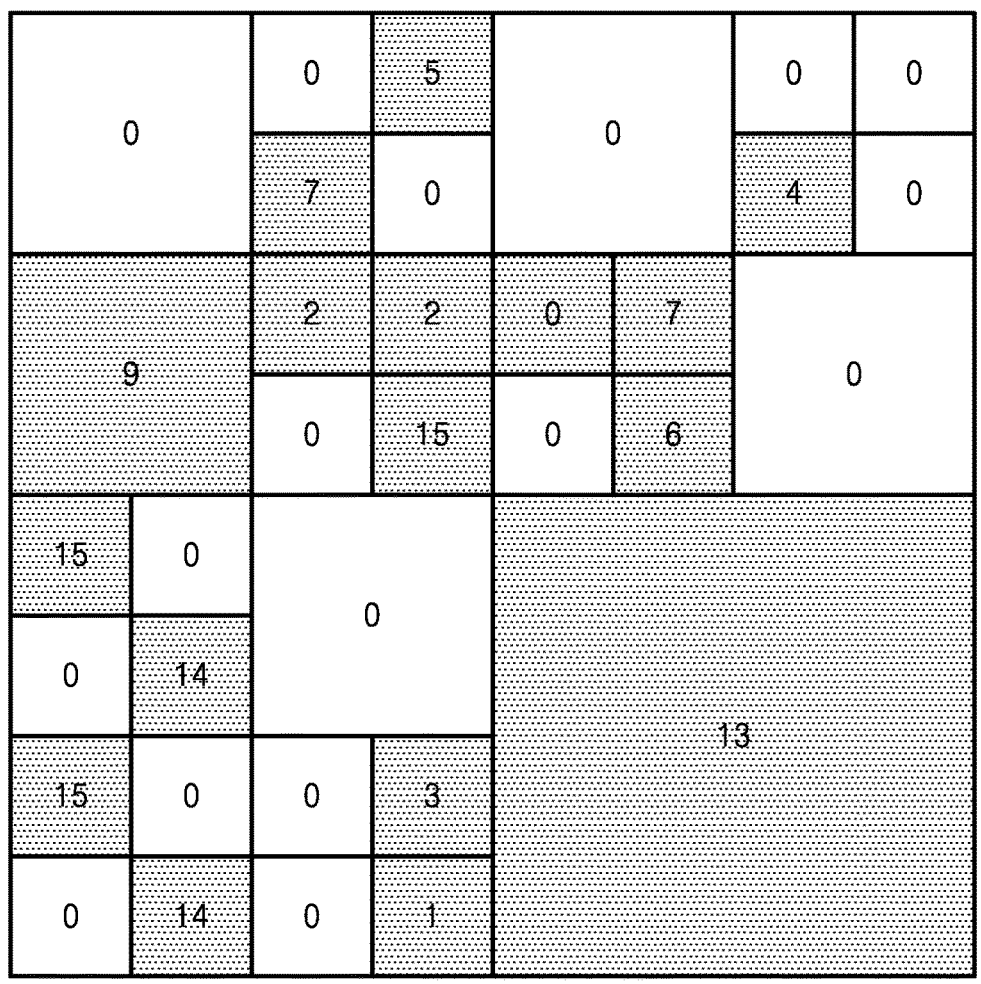
FIG. 12 is a diagram illustrating another example in which a block is divided in the encoding device according to the first embodiment.

In addition, a method of dividing a frame in units of blocks is not limited to a method shown in FIG. 8. Alternatively, a frame may be divided into four hierarchical blocks as shown in FIG. 12. When a frame is divided into four hierarchical blocks, a superordinate parent block may be divided into four subordinate child blocks (sub-blocks). Here, it may be selected whether or not each block is divided into child blocks. In addition, a filter type may be determined for each of the divided child blocks.

In the case of a filter type, a second index may be shown using four bits as shown in FIGS. 6 and 7, and a first index indicating whether or not the second index exists may be shown using one bits. When filtering is performed, the amount of information of the filter type is determined to be five bits. When filtering is not performed, the amount of information of the filter type is determined to be one bit, and thus encoding efficiency may be improved.

The color difference filter information determination unit 163 of FIG. 3 may acquire a local decoding image having a 4:4:4 format which is filtered by the color difference filtering unit 161 and a source image having a 4:4:4 format of the luminance color difference image generation unit 110. The color difference filter information determination unit 163 may calculate a square error between the acquired local decoding image and source image to thereby determine an optimal value of color difference filter information. The color difference filter information determination unit 163 may calculate a square error of an image filtered according to a plurality of pieces of color difference filter information which are set by the color difference filter information setting unit 162. The color difference filter information determination unit 163 may determine color difference filter information having a minimum square error to be optimal color difference filter information. The color difference filter information determination unit 163 may output the determined optimal color difference filter information to the color difference filter information multiplexing unit 170.

For example, when the color difference filter information determination unit 163 determines an optimal value of color difference filter information by using a rate-distortion optimization (RDO) method, C determined according to Expression 4 may be used.

$$C = D + \lambda R \qquad (4)$$

In Expression 4, D (distortion) denotes the degree of an improvement in image quality such as a square error or an absolute value error between a source image and a local decoding image. In Expression 4, R (rate) denotes a code amount (the amount of data) of encoding data including color difference filter information (a filter parameter and a filter type), and λ denotes a predetermined coefficient. The color difference filter information determination unit 163 may change and apply the color difference filter information. The color difference filter information determination unit 163 may determine a filter parameter and a filter type which have a small error and a small code amount and have a minimum cost C to be optimal values in accordance with the application result.

FIGS. 9 and 10 show an example of a syntax of color difference filter information which is determined by the color difference filter information determination unit 163 and is multiplexed by the color difference filter information multiplexing unit 170. A filter parameter syntax of FIG. 9 may correspond to each information of the filter parameters of FIG. 5. Information on a radius of a kernel, a distance standard deviation, a luminance standard deviation, a first color difference standard deviation, and a second color difference standard deviation may be determined for each of color difference signals (Cb and Cr) in accordance with the filter parameter syntax of FIG. 9. In addition, the sizes of a block in horizontal and vertical directions may be determined in accordance with the filter parameter syntax of FIG. 9.

a filter type syntax of FIG. 10 may correspond to the first index of FIG. 6 and the second index of FIG. 7. A first index and a second index may be repeatedly set in units of blocks in accordance with the filter type syntax. A first index of a color difference signal (Cb) may be set in accordance with the filter type syntax. When a value of the first index is 1, a second index of the color difference signal (Cb) may be set.

In addition, a parent block may be divided into four child blocks as shown in FIG. 12 by using division information of the filter type syntax of FIG. 10 (a flag indicating whether or not a child block is divided). Alternatively, in a method such as H. 264/AVC or H. 265/HEVC, information of a filter type is added to a syntax which is determined in advance in the same unit as a prediction block or a conversion block in accordance with a block-based encoding method of the related art, and thus a block may be divided without separately transmitting division information.

Figure 11:
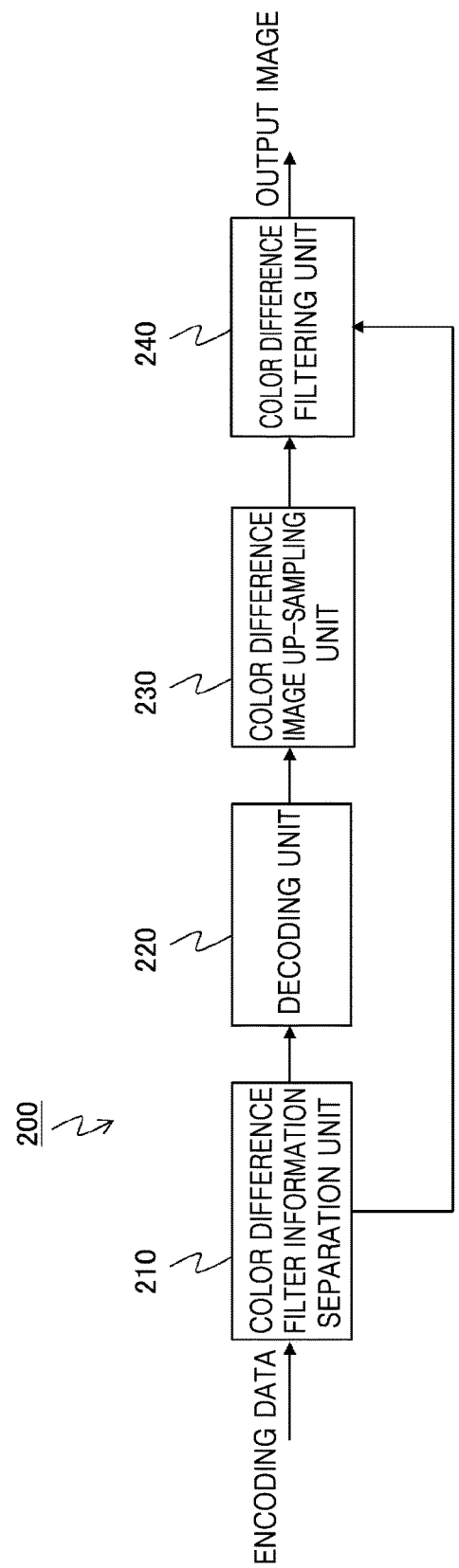
FIG. 11 is a block diagram illustrating the configuration of a decoding device according to the first embodiment.

FIG. 11 is a block diagram illustrating the configuration of a decoding device 200 according to the current embodiment. As shown in FIG. 11, the decoding device 200 according to the current embodiment includes a reception unit (not shown), a decoding unit 220, a color difference image up-sampling unit 230, and a color difference filtering unit 240. Meanwhile, the reception unit (not shown) may include a color difference filter information separation unit 210 according to the current embodiment.

The color difference filter information separation unit 210 receives encoding data transmitted from the encoding device 100 and divides the received encoding data into image information and color difference filter information. The image information is encoding image which is encoded by the encoding unit 130 of the encoding device 100, and the color difference filter information is information which is generated by the color difference filter information generation unit 160 of the encoding device 100. As described above, the color difference filter information may be set in accordance with the syntaxes of FIGS. 9 and 10.

The decoding unit (second decoding unit) 220 decodes image information divided by the color difference filter information separation unit 210 to thereby generate a decoding image. The decoding image is a YCbCr image having a 4:2:0 format. The decoding unit 220 decodes image information in the same manner as a method performed by the local decoding unit 140 of the encoding device 100.

The color difference image up-sampling unit (second up-sampling unit) 230 performs up-sampling of a color difference image of the decoding image having a 4:2:0 format which is generated by the decoding unit 220 to thereby generate a decoding image having a 4:4:4 format. Here, an up-sampling method is the same as the up-sampling method performed by the color difference image up-sampling unit 150 of the encoding device 100. The color difference image up-sampling unit 230 performs up-sampling in the same manner as the up-sampling performed by the color difference image up-sampling unit 150 to thereby generate an image which is the same as an image (local decoding image) before the color difference filtering unit 161 of the encoding device 100 performs filtering.

The color difference filtering unit (second filtering unit) 240 may acquire the decoding image up-sampled by the color difference image up-sampling unit 230 and the color difference filter information divided by the color difference filter information separation unit 210. The color difference filtering unit 240 performs reference type filtering in accordance with FIG. 4 and Expression 1 to Expression 3 in the same manner as the color difference filtering unit 161 of the encoding device 100 to thereby output a generated output image. Specifically, the color difference filtering unit 240 sets a color difference signal and a luminance signal of the decoding image as decoding images and performs reference type filtering on the color difference signal which is a target signal. The color difference filtering unit 240 determines filter information and the size of a block on the basis of filter parameters in accordance with a syntax of the acquired color difference filter information and determines whether or not a filter is applied or a weight for each block on the basis of a filter type. Filtering is performed in accordance with optimal color difference filter information determined by the color difference filtering unit 161 of the encoding device 100, and thus the color difference filtering unit 240 may generate an output image with an improved image quality.

As described above, in the current embodiment, a reference type filter using a luminance image and a color difference image as reference signals is used as a post filter with respect to the color difference image deteriorated due to encoding, by using a high correlation between the luminance image and the color difference image. In addition, an encoding side generates and transmits color difference filter information for changing a filter parameter and a filter type in units of images or blocks, and thus a decoding side may perform filtering on the basis of the received color difference filter information. In the current embodiment, a reference type filter using a luminance image and a color difference image as reference signals is applied as a post filter, and thus it is possible to reduce noise of the color difference image and to improve sharpness of the color difference image.

According to the current embodiment, it is also possible to improve image quality of a color difference image by using a method having a lower complexity than a noise removal method and a method for improving sharpness of the related art. In addition, an encoding side transmits additional information for controlling filtering, and thus it is possible to improve encoding efficiency.

In the current embodiment, reference type filtering using a joint bilateral filter may be performed on a color difference image. In addition, an encoding side generates filter parameters such as a weight coefficient of a filter and a kernel size and a filter type for controlling a reference image and transmits the filter parameters and the filter type to a decoding side, and thus it is possible to perform optimized filtering in units of frames or blocks. In the current embodiment, optimized filtering may be performed in units of frames or blocks, and thus it is possible to effectively improve image quality of a color difference image deteriorated due to encoding. The above-described embodiment is not disclosed in Japanese Laid-open Patent Publication No. 2009-153013, Japanese Laid-open Patent Publication No. 2012-216888, Pamphlet of International Publication No. 2009-110160, PCT Japanese Translation Patent Publication No. 2007-506361, Japanese Laid-open Patent Publication No. 2003-179933, US Patent Publication No. 2011/0243249, C. Tomasi and R. Manduchi, "Bilateral filtering for gray and color images", IEEE International Conference on Computer Vision (ICCV1998), pp. 839-846, January 1998, S. Wittmann and T. Wedi, "Post-filter SEI message for 4:4:4 coding", JVT (Joint Video Team) of ISO/IEC MPEG & ITU-T VCEG, JVT-5030, April, 2006, and G. Petschnigg, M. Agrawala, H. Hoppe, R. Szeliski, M. Cohen and K. Toyama, "Digital photography with flash and no-flash image pairs", ACM Transactions on Graphics (SIGGRAPH2004), vol. 23, no. 3, pp. 664-672, August 2004.

Second Embodiment

Hereinafter, a second embodiment will be described. The current embodiments relates to a method of encoding and decoding an image by performing joint bilateral up-sampling. In addition, a general joint bilateral up-sampling is disclosed in "J. Kopf, M. F. Cohen, D. Lischinski, M. Uyttendaele, "Joint Bilateral Upsampling", SIGGRAPH2007, No. 96, 2007".

Figure 13:
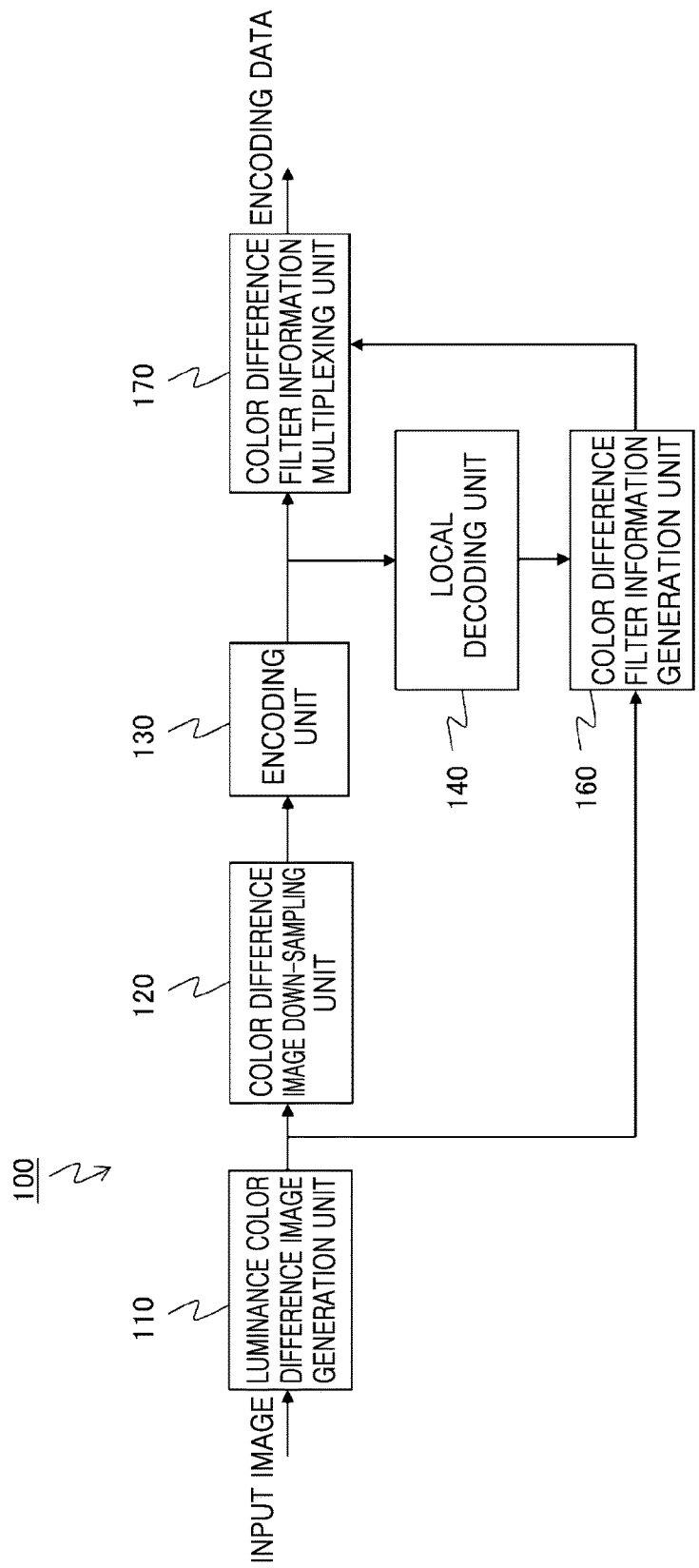
FIG. 13 is a block diagram illustrating the configuration of an encoding device according to a second embodiment.

FIG. 13 illustrates the configuration of an encoding device 100 according to the current embodiment, and FIG. 14 illustrates the configuration of a decoding device 200 according to the current embodiment. In the current embodiment, the color difference image up-sampling units 150 and 230 described in the first embodiment may not be used by performing joint bilateral up-sampling. In the second embodiment, components other than the color difference image up-sampling units 150 and 230 may be the same as those in the first embodiment.

Referring to FIG. 14, a local decoding unit 140 of the encoding device 100 may output a generated local decoding image to a color difference filter information generation unit 160. The color difference filter information generation unit 160 may generate color difference filter information by performing up-sampling and filtering on the basis of a local decoding image and a source image on which up-sampling is not performed. A decoding unit 220 of the decoding device 200 may output a generated decoding image to a color difference filtering unit 240. The color difference filtering unit 240 may generate an output image by performing up-sampling and filtering on the basis of a decoding image and color difference filter information on which up-sampling is not performed.

In the current embodiment, a color difference filtering unit 161 of the color difference filter information generation unit 160 and the color difference filtering unit 240 may perform joint bilateral up-sampling instead of performing filtering by using a joint bilateral filter as a reference type filter as in operation S102 and operation S103. Specifically, in the current embodiment, up-sampling and filtering may be performed using the following Expression 5 instead of Expression 1. In Expression 5, $\downarrow$ denotes a down-sampled pixel as in FIG. 2.

$$F[C]_p = \frac{1}{W_p} \sum_{q \in \Omega} G_{\sigma_s}(\|\downarrow p - \downarrow q\|) \cdot G_{\sigma_{r0}}(|Y_p - Y_q|) \cdot \quad (5)$$

$$G_{\sigma_{r1}}(|\downarrow Cb_p - \downarrow Cb_q|) \cdot G_{\sigma_{r2}}(|\downarrow Cr_p - \downarrow Cr_q|) \downarrow C_q.$$

That is, the color difference filtering unit 161 and the color difference filtering unit 240 may perform up-sampling of down-sampled color difference signals (Cb and Cr) and may perform filtering on the color difference signal (Cb) by setting a luminance signal (Y) and the color difference signals (Cb and Cr) as reference signals and using a reference type filter such as a joint bilateral filter. In addition, the color difference filtering unit 161 and the color difference filtering unit 240 may perform up-sampling of the down-sampled color difference signals (Cb and Cr) and may perform filtering on the color difference signal (Cr) by setting the luminance signal (Y) and the color difference signals (Cb and Cr) as reference signals and using a reference type filter such as a joint bilateral filter.

As described above, it is possible to encode and decode an image by using joint bilateral up-sampling instead of the joint bilateral filter of the first embodiment. Up-sampling and filtering are simultaneously performed by using joint bilateral up-sampling, and thus an up-sampling unit may not be used. In the second embodiment, up-sampling and filtering are simultaneously performed, and thus it is possible to increase a processing speed of image encoding and decoding.

Third Embodiment

Hereinafter, a third embodiment will be described. The current embodiment is an example of a method of adding an adaptive parameter of an adaptive bilateral filter to the method described in the first or second embodiment. In addition, a general adaptive bilateral filter is disclosed in "Buyue Zhang, Jan P. Allebach, "Adaptive Bilateral Filter for Sharpness Enhancement and Noise Removal", IEEE TRANSACTIONS ON IMAGE PROCESSING, VOL. 17, NO. 5, May 2008".

The configurations of an encoding device 100 and a decoding device 200 according to the current embodiment are the same as those in the first embodiment (or the second embodiment).

In the current embodiment, a color difference filtering unit 161 of a color difference filter information generation unit 160 and a color difference filtering unit 240 may perform joint bilateral filtering using an adaptive parameter of an adaptive bilateral filter in operation S102 and operation S103 of FIG. 4. Specifically, the joint bilateral filtering using an adaptive parameter of an adaptive bilateral filter may be expressed by adding an adaptive parameter $\zeta$ to Expression 1 and Expression 3. Here, the adaptive parameter $\zeta$ may be added to a weight term of a color difference image on which filtering is performed in Expression 1 and Expression 2. For example, when filtering is performed on Cb, the adaptive parameter $\zeta$ may be added to a weight term of Cb. In addition, when filtering is performed on Cr, the adaptive parameter $\zeta$ may be added to a weight term of Cr. That is, Expression 1 and Expression 3 may be expressed as Expression 6 and Expression 7 by using $\delta 1$ and $\delta 2$ of Expression 8.

$$F[C]_p = \qquad (6)$$

$$\frac{1}{W_p} \sum_{q \in \Omega} G_{\sigma_s}(\|p-q\|) \cdot G_{\sigma_{r0}}(|Y_p - Y_q|) \cdot G_{\sigma_{r1}}(|Cb_p - Cb_q + \zeta \cdot \delta_1|) \cdot$$

$$G_{\sigma_{r2}}(|Cr_p - Cr_q + \zeta \cdot \delta_2|) \cdot C_q.$$

$$W_p = \sum_{q \in \Omega} G_{\sigma_s}(\|p-q\|) \cdot G_{\sigma_{r0}} \qquad (7)$$

$$(|Y_p - Y_q|) \cdot G_{\sigma_{r1}}(|Cb_p - Cb_q + \zeta \cdot \delta_1|) \cdot G_{\sigma_{r2}}(|Cr_p - Cr_q + \zeta \cdot \delta_2|).$$

$$\delta_1 = \begin{cases} 1 & (C = Cb) \\ 0 & (C = Cr) \end{cases} \quad \delta_2 = \begin{cases} 0 & (C = Cb) \\ 1 & (C = Cr) \end{cases} \qquad (8)$$

In the current embodiment, it is possible to determine the effect of filtering by changing the adaptive parameter $\zeta$. In the current embodiment, the adaptive parameter $\zeta$ may be included in color difference filter information. That is, a color difference filter information determination unit 163 of the encoding device 100 may determine an optimal value of the color difference filter information including the adaptive parameter $\zeta$. In addition, the decoding device 200 may perform filtering by using the color difference filter information including the adaptive parameter $\zeta$. In the current embodiment, it is possible to adjust the effect of filtering in units of frames by adding the adaptive parameter $\zeta$ to a filter parameter of the color difference filter information. In addition, it is possible to adjust the effect of filtering in units of blocks by adding the adaptive parameter $\zeta$ to a filter type of the color difference filter information.

The adaptive parameter $\zeta$ may be determined depending on characteristics of a frame on which filtering is performed. For example, in the case of a frame including an edge (or an edge region), it is possible to make the edge clear by increasing the adaptive parameter $\zeta$. In addition, in the case of a flat image (or a flat region), it is possible to generate a natural image by decreasing the adaptive parameter $\zeta$. Characteristics of the image may be detected by the encoding device 100 before color difference filtering.

As described in the third embodiment, an adaptive parameter of an adaptive bilateral filter may be added to the joint bilateral filtering of the first embodiment or the joint bilateral up-sampling of the second embodiment. In the third embodiment, filtering is performed by adding an adaptive parameter, and thus it is possible to improve image quality.

As described above, according to the one or more of the above exemplary embodiments, it is possible to improve image quality and encoding efficiency.

It should be understood that the exemplary embodiments described therein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image encoding device comprising:
an encoding unit that encodes a down-sampling image obtained by performing down-sampling of a color difference signal of an original image;
a decoding unit that decodes the encoded down-sampling image; a filter information generation unit that generates an up-sampled image by performing up-sampling of a color difference signal of the decoded image, determines a filter based on a difference between the up-sampled image and the original image and acquires filter information related to the filtering,
wherein the filter information comprises information on a filter type that comprises a first index indicating whether or not the filtering is performed and a second index indicating whether or not at least one weight is applied to the filtering.

2. The image encoding device of claim 1, further comprising a multiplexing unit that multiplexes the acquired filter information and the encoding image to thereby generate encoding data.

3. The image encoding device of claim 1, further comprising:
an up-sampling unit that performs up-sampling of the color difference signal of the image; and
a filtering unit that filters the up-sampled decoded image.

4. The image encoding device of claim 1, wherein the filter information comprises a filter parameter which is information for controlling a size or strength of a filter.

5. The image encoding device of claim 1, wherein the filter information comprises an adaptive parameter which is determined depending on characteristics of a frame on which the filtering is performed.

6. The image encoding device of claim 1, wherein the second index is set only when the filtering is performed.

7. The image encoding device of claim 1, wherein the second index indicates whether or not at least one weight of a distance weight, a luminance weight, a first color difference weight, and a second color difference weight is applied to the filtering.

8. The image encoding device of claim 1, wherein the filter information generation unit determines an optimal value of filter information so that the difference between the original image and the up-sampled image is minimized.

9. An image decoding device comprising:
a filter information separation unit that separates an encoding image and filter information from a reception unit that receives encoding data including the encoding image and the filter information, the encoding image being obtained by encoding a down-sampling image which is obtained by performing down-sampling of a color difference signal of an original image;
a decoding unit that decodes the separated encoding image; and
a filtering unit that generates a up-sampled image by performing up-sampling of the color difference signal of the decoded decoding image and filters the up-sampled image in accordance with the filter information which indicates a filter determined based on a difference between the up-sampled image and the original image,
wherein the filter information comprises information on a filter type that comprises a first index indicating whether or not the filtering is performed and a second index indicating whether or not at least one weight is applied to the filtering.

10. The image decoding device of claim 9, wherein the reception unit comprises a filter information separation unit that separates the encoding image and the filter information from encoding data which is obtained by multiplexing the encoding image and the filter information.

11. The image decoding device of claim 9, wherein the filter information comprises a filter parameter which is information for controlling a size or strength of a filter.

12. The image decoding device of claim 9, wherein the filter information comprises an adaptive parameter which is determined depending on characteristics of a frame on which the filtering is performed.

13. The image decoding device of claim 9, wherein the second index is set only when the filtering is performed.

14. The image decoding device of claim 9, wherein the second index indicates whether or not at least one weight of a distance weight, a luminance weight, a first color difference weight, and a second color difference weight is applied to the filtering.

15. An image encoding method comprising:
- encoding a down-sampling image obtained by performing down-sampling of a color difference signal of an original image;
- decoding the encoded down-sampling;
- generating a up-sampled image by performing up-sampling of a color difference signal of the decoded image;
- determining a filter based on a difference between the up-sampled image and the original image; and
- acquiring filter information related to the filtering,
- wherein the filter information comprises information on a filter type that comprises a first index indicating whether or not the filtering is performed and a second index indicating whether or not at least one weight is applied to the filtering.

16. An image decoding method comprising:
- receiving encoding data comprising an encoding image obtained by encoding a down-sampling image and filter information, the down-sampling image being obtained by performing down-sampling of a color difference signal of an original image;
- decoding the encoding image separated from the encoding data;
- generating a up-sampled image by performing up-sampling of the color difference signal of the decoded image; and
- filtering the up-sampled image in accordance with the filter information which indicates a filter determined based on a difference between the up-sampled image and the original image,
- wherein the filter information comprises information on a filter type that comprises a first index indicating whether or not the filtering is performed and a second index indicating whether or not at least one weight is applied to the filtering.

17. A non-transitory computer readable recording medium having embodied thereon a computer program for executing the image encoding method of claim 15.

18. A non-transitory computer readable recording medium having embodied thereon a computer program for executing the image decoding method of claim 16.

* * * * *